United States Patent
Pan et al.

[11] Patent Number: 5,892,781
[45] Date of Patent: Apr. 6, 1999

[54] HIGH OUTPUT FIBER AMPLIFIER/LASERS FOR FIBEROPTIC NETWORKS

[75] Inventors: Jing-Jong Pan, Milpitas; Yuan Shi, San Jose, both of Calif.

[73] Assignee: E-Tek Dynamics, Inc., San Jose, Calif.

[21] Appl. No.: 922,032

[22] Filed: Sep. 2, 1997

[51] Int. Cl.$^6$ .............................. H01S 3/30; H01S 3/00; G02B 6/28

[52] U.S. Cl. .................................. 372/6; 372/69; 372/70; 372/96; 372/102; 359/341; 359/345; 359/115; 359/124; 359/134; 385/24; 385/39; 385/42; 385/37

[58] Field of Search .............................. 372/6, 21, 2, 70, 372/71, 72, 96, 99, 102; 359/341, 345, 115, 124, 127, 130, 134; 385/39, 42, 24, 37, 49

[56] References Cited

U.S. PATENT DOCUMENTS

| | | | |
|---|---|---|---|
| 4,938,556 | 7/1990 | Digonnet et al. | 372/6 X |
| 5,119,230 | 6/1992 | Pfeiffer | 359/341 |
| 5,134,620 | 7/1992 | Huber | 372/6 |
| 5,140,456 | 8/1992 | Huber | 359/341 |
| 5,191,586 | 3/1993 | Huber | 372/6 |
| 5,195,149 | 3/1993 | Pfeiffer et al. | 385/28 |
| 5,216,728 | 6/1993 | Charlton et al. | 385/27 |
| 5,268,910 | 12/1993 | Huber | 372/6 |
| 5,297,154 | 3/1994 | Heidemann et al. | 372/6 |
| 5,311,603 | 5/1994 | Fidric | 385/11 |
| 5,436,751 | 7/1995 | Ohya et al. | 359/182 |
| 5,555,330 | 9/1996 | Pan et al. | 385/39 |
| 5,638,204 | 6/1997 | Grasso et al. | 359/341 |
| 5,642,448 | 6/1997 | Pan et al. | 385/31 |
| 5,652,814 | 7/1997 | Pan et al. | 385/24 |
| 5,748,364 | 5/1998 | Meli et al. | 359/341 |
| 5,790,722 | 8/1998 | Minden et al. | 385/27 |

OTHER PUBLICATIONS

Agrawal, *Nonlinear Fiber Optics, Second Edition*, Chapter 12, pp. 539–540, Academic Press, 1995.

*Primary Examiner*—Brian Healy
*Attorney, Agent, or Firm*—Townsend and Townsend and Crew LLP

[57] ABSTRACT

Arrangements for high output power laser sources and optical fiber amplifiers are disclosed. In one arrangement, an optical fiber section which is doped with erbium, is coupled with one or two mirror elements, such as fiber Bragg gratings, to form a DBR or DFB fiber laser. The optical fiber section receives energy at one end from a pumping laser and lases at one or more selected wavelengths. This output light, along with energy from the pumping laser, is transmitted through the second end of the optical fiber section to an erbium-doped fiber amplifier, which boosts the laser output even higher. The gain of the optical fiber section may be further increased by co-doping the section with erbium and ytterbium. With co-doped optical fiber sections, high power output fiber optical amplifiers and laser sources, in the form of DBR and DFB fiber lasers, which can accept the pumping energies of a plurality of pumping lasers, can be created with properly selected WDM coupler and WDM coupler/isolator devices.

32 Claims, 4 Drawing Sheets

HIGH OUTPUT FIBER AMPLIFIER/LASERS FOR FIBEROPTIC NETWORKS

BACKGROUND OF THE INVENTION

The present invention is related to the field of laser amplifiers and sources for fiberoptic networks and, more particularly, to lasing elements created in a doped optical fiber.

One of the devices which has recently enhanced the use of fiberoptic networks has been the erbium-doped fiber amplifier. In the erbium-doped fiber amplifier, the light at one wavelength from a pumping laser is combined in a section of erbium-doped optical fiber with the message signal at a second wavelength. The pumping laser provides the energy for a gain in the message signal as it passes through the erbium-doped optical fiber section. The erbium-doped fiber amplifier is compatible with a fiberoptic network since the amplifier is mostly optical fiber.

On the other hand, light sources for fiberoptic networks have heretofore been mostly semiconductor devices, such as laser diodes, light-emitting diodes, and other semiconductor laser sources. A new type of laser source is a rare-earth doped optical fiber section with wavelength-selective reflectors at the ends of the section to define a lasing cavity. As in the case of the erbium-doped fiber amplifier, a pumping laser supplies energy to the doped fiber section at one, or multiple, wavelengths. The fiber section lases at one, or multiple, different output wavelengths. While seemingly compatible with fiberoptic networks, this laser source has a relatively low output power and the advantages of this laser source have yet to be appreciated.

In many fiberoptic networks, WDM (Wavelength Division Multiplexed) networks, in particular, a large number of laser sources for signal generation are required. Since the wavelength of an optical signal is used to direct the signal from its source to its destination, each user typically has a laser source operating at a specific wavelength which could be different from those of other laser sources. A laser source having a fixed and precise output wavelength is very desirable. An emerging standard is the Dense WDM proposed by the ITU, the International Telecommunications Union, in which the separation between communication channels in only 0.8 nm in wavelength, or 100 GHz in frequency. Thus the constraints for a light source with a very narrow output linewidth, i.e., the wavelength of the output signal, are even tighter.

The present invention allows for the full exploitation of the compatibility of these fiber amplifier and lasers mentioned above with fiberoptic networks. With the present invention, the output power of the fiber amplifier and lasers is increased so that the performance of fiberoptic networks using these devices is increased. Laser sources with high output power and the precise output wavelengths are presented to meet the requirements of WDM and dense WDM networks. Furthermore, the output power of fiber amplifiers is increased so that the applicability of these devices in fiberoptic networks is enhanced.

SUMMARY OF THE INVENTION

The present invention provides for a laser source which generates light at one or more selected wavelengths in an output optical fiber. The source has a fiber laser having at least one mirror element and a first optical fiber section coupled with the mirror element to form a DBR fiber laser or a DFB fiber laser for lasing action at one or more of the selected wavelengths. The first optical fiber section has at least a portion doped with a rare-earth element, such as erbium, or co-doped with a combination of rare-earth elements, such as erbium and praseodymium. A first end of the section receives pumping laser light and a second end is connected to an optical fiber amplifier which has a second optical fiber section with at least a portion also doped with erbium, or co-doped with erbium and ytterbium. The first end of the second optical fiber section is connected to the second end of said first optical section by a first WDM coupler. The second end of the second optical fiber section is connected to said output optical fiber by a second WDM coupler such that the first WDM coupler sends the pumping laser light to the second WDM coupler. The second WDM coupler directs the pumping laser light into the second optical fiber section and passes the amplified light from the second optical fiber section to the output optical fiber at the selected wavelength.

The present invention also provides for an optical fiber amplifier which receiving message signals at a first wavelength, or wavelengths, in an input output fiber and amplifies the message signal for an output optical fiber. The optical fiber amplifier has a section of optical fiber at least a portion of which is co-doped with erbium and ytterbium. A first end of the section is connected to the input optical fiber and a second end is connected to the output optical fiber. A plurality of pumping lasers at wavelengths shorter than the first, or message, wavelength(s) are connected to the optical fiber section so as to provide energy to the optical fiber section for providing gain to the message signals in passing from the first end to the second end of the optical fiber section. The optical fiber amplifier has a significant increase in the gain and output power as compared to fiber amplifiers doped with erbium only.

Another embodiment of the present invention is a laser source which generates message signals at a first, or multiple, wavelength(s) for an output optical fiber. The laser source has a section of optical fiber with at least a portion doped with erbium, or co-doped with erbium and ytterbium. A first end of the section is connected to the input optical fiber and a second end is connected to the output optical fiber. At least one mirror element is coupled with the optical fiber section to form a DBR fiber laser or a DFB fiber laser for laser action at the first, or multiple, wavelength(s). A plurality of pumping lasers at wavelengths shorter than the first wavelength is connected to the optical fiber section so as to provide energy to the optical fiber section for lasing operation in the cavity at the first, or multiple, wavelength(s) at high power.

DETAILED DESCRIPTION OF SPECIFIC EMBODIMENTS

It should be noted that the same reference numeral is sometimes used for an element in a different arrangements in the drawings to emphasize that the element has substantially the same function or operation as that of the element in an earlier drawing, for a better understanding of the different aspects of the present invention.

Figure 1A:
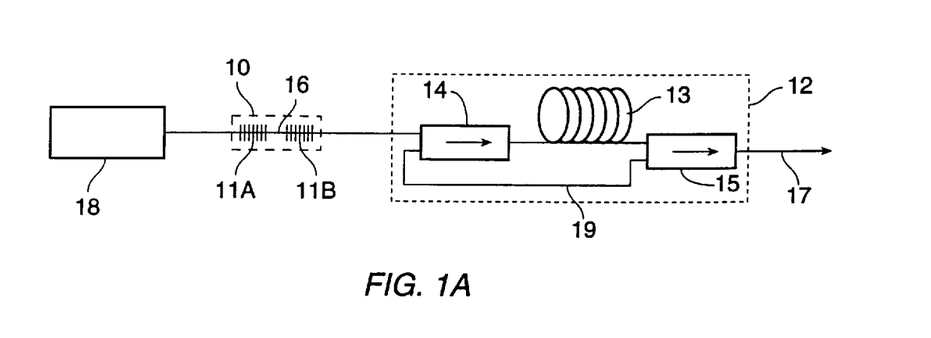
FIG. 1A is a block diagram of a DBR fiber laser and amplifier arrangement according to an embodiment of the present invention.

One embodiment of the present invention is depicted in FIG. 1A. The output of a fiber laser source, in the form of a DBR (Distributed Bragg Reflectors) fiber laser 10, is connected to an erbium-doped fiber amplifier (EDFA) 12. A pumping laser 18 provides energy for both the DBR fiber laser 10 and EDFA 12. The wavelength of the output signal is precisely set by the DBR laser 10 and the power of the output signal is high from the operation of the EDFA 12.

The DBR fiber laser 10 is formed from a fiber section 16 which is doped with the ions of a rare-earth metal, such as erbium, or co-doped with the other elements, such as a combination of sulfur, gallium and lanthanum. Fiber Bragg gratings 11A and 11B are on either side of the section 16. These fiber Bragg gratings 11A and 11B have reflectivities arranged about a predetermined wavelength $\lambda_c$, such as illustrated in FIGS. 2A–2C.

In this embodiment the predetermined center wavelength $\lambda_c$ is in the 1550 nm range, i.e., a narrow output wavelength band centered about $\lambda_c$, which is somewhere from 1520 nm to 1580 nm. Connected at one end of the laser 10, the pumping laser 18 provides energy at a shorter wavelength, 980 nm, in this example, to the laser 10. Other pumping wavelengths, such as 800, 850, 900–970, 1047, 1068 and 1480 nm, are also possible. The fiber section 16 is doped with erbium. The pumping laser 18 pumps the electrons in the erbium-doped fiber section 16 into higher energy states and the fiber Bragg gratings 11A and 11B define a lasing cavity. As the pumped electrons drop from their higher energy states and release their energy, the reflectivities of the fiber Bragg gratings 11A and 11B define the output wavelength $\lambda_c$ of the laser 10.

A fiber Bragg grating is created in an optical fiber by a periodic variation in the propagation constant (or the refractive index) of the fiber core, as symbolically indicated by the vertical bars in the drawings. A typical fiber Bragg grating has a narrow reflection linewidth, or band. The fiber Bragg gratings 11A and 11B are designed such that light in a narrow linewidth centered about the predetermined wavelength $\lambda_c$ is reflected back toward the doped fiber section 16.

Figure 2A:
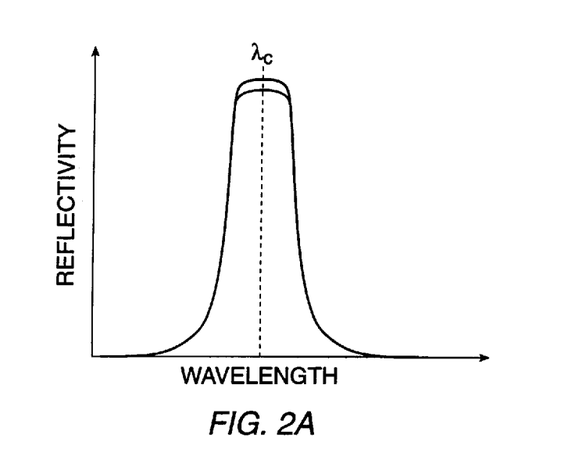
FIGS. 2A–2C are different graphs of the fiber Bragg grating reflectivity profiles versus wavelength for the DBR laser of FIG. 1A.
Figure 2B:
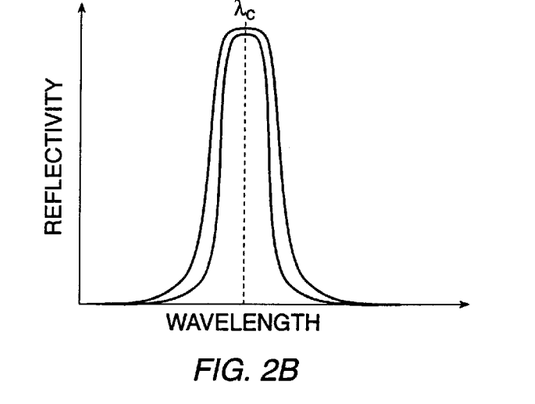
Figure 2C:
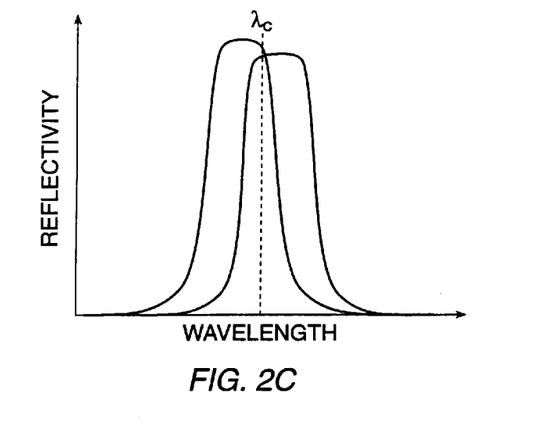

FIGS. 2A–2C illustrate the different possible reflectivities of the fiber Bragg gratings 11A and 11B. In FIG. 2A the reflectivities of the two fiber Bragg gratings 11A and 11B are nearly identical and centered about the wavelength $\lambda_c$. In FIG. 2B the reflectivities of the two fiber Bragg gratings 11A and 11B are similar but centered about the wavelength $\lambda_c$. In FIG. 2C the ref lectivities of the two fiber Bragg gratings 11A and 11B are each centered about different wavelengths, but the maximum overlap occurs at the wavelength $\lambda_c$. In all these cases the output of the DBR laser 10 is centered about wavelength $\lambda_c$. It is also possible to have multiple output wavelengths by adding paired fiber Bragg gratings at the two ends of the fiber section 16 as the reflection wavelengths as that described above. Furthermore, if a short portion of the fiber section 16 is doped with a rare-earth element, praseodymium, it has been found that undesirable relaxation oscillations in the doped section 16 are substantially dampened.

Figure 1B:
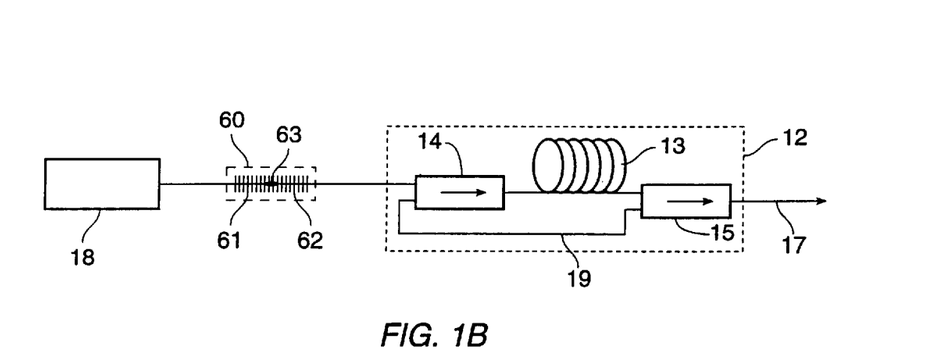
FIG. 1B is a block diagram of a DFB fiber laser and amplifier arrangement according to another embodiment of the present invention.

In place of the DBR fiber laser 10, a Distributed Feedback (DFB) fiber laser may be used in the FIG. 1A arrangement. FIG. 1B illustrates a DFB fiber laser 60 connected to the erbium-doped fiber amplifier (EDFA) 12 and the pumping laser 18, which provides energy for both the DFB laser 60 and EDFA 12. Similar to a DBR fiber laser, the DFB laser 60 is formed from a fiber section 62 which is doped with the ions of a rare-earth metal, such as erbium, or co-doped with other elements, such as a combination of sulfur, gallium and lanthanum. But rather than a pair of fiber Bragg gratings on either side of the doped fiber section, the DFB fiber laser 60 has a single fiber Bragg grating 61 formed in the doped fiber section 62, as represented in FIG. 1B. The DFB fiber laser 60 also has a phase shift region 63 central to the fiber Bragg grating 61.

Returning to the other elements of FIGS. 1A and 1B, the EDFA 12 has a section of erbium-doped fiber 13 between two integrated WDM coupler/isolators 14 and 15. Each integrated WDM coupler/isolator 14 and 15 is a combination of a WDM coupler and an optical isolator. The WDM coupler receives light from one optical fiber and can direct the light to a second optical fiber or to a third optical fiber, responsive to the wavelength of the light. The optical isolator is placed in the path of one of these output fibers. The present invention uses the wavelength selectivity of the WDM coupler in the FIGS. 1A and 1B arrangements, and other embodiments of the present invention described below, to direct light at different wavelengths to their proper destinations. For example, it should be noted that WDM couplers ensure that the output light of the pumping lasers, which are always at shorter wavelengths, i.e., higher energies, of that of the message signals, do not reach the output optical fiber of the various devices described.

A highly integrated WDM coupler/isolator is described in U.S. application Ser. No. 08/470,815, entitled "INTEGRABLE FIBEROPTIC COUPLER AND RESULTING DEVICES AND SYSTEMS", and filed Jun. 6, 1995 by J. J. Pan et al. and assigned to the present assignee, and which is incorporated by reference herein. Such devices, termed Fiber Isolator/Wavelength Division Multiplexer Combination (IWDM) and Integrated Fiber Amplifier Modules (IFAM), and which may be obtained from E-Tek Dynamics of San Jose, California, the present Assignee, have been found to work effectively in the present invention. Both WDM coupler/isolators 14 and 15 are the so-called "backward pump type," which is indicative where such coupler/isolators are typically located in a EDFA. A second type of device is termed, "forward pump type," as might be expected.

Operationally, the WDM coupler/isolator 14 receives the output from the DBR fiber laser 10 (or DFB fiber laser 60) whose output is in the 1550 nm range and from the pumping laser 18 with unabsorbed light in the 980 nm range. The WDM coupler/isolator 14 passes the 1550 nm wavelength light signals to the doped fiber section 13. In contrast, the 980 nm light is diverted to an optical fiber 19 to the second WDM coupler/isolator 15. In turn, the WDM coupler/isolator 15 receives light in the 1550 nm range from the doped section 13 and passes that light to the output fiber 17. On the other hand, the 980 nm wavelength light on the fiber 19 is sent back toward the doped fiber section 13 by the WDM coupler/isolator 15. Thus the 980 nm light provides the pumping energy for the erbium-doped section 13 to amplify the light signals in the 1550 nm range from the coupler 14. The optical isolators at the output of each of these coupler/isolators 14 and 15 ensure that no light at any wavelength are reflected back. Hence, a single pumping laser 18 provides the energy for both the laser 10 (60) and the amplifier 12.

With the fiber Bragg grating 11A at over 99% reflectivity with a relatively broad bandwidth of 0.35 nm, and the grating 11B ranging from 92% to 98% and a relatively narrow bandwidth of 0.2 nm, output power over 14 dBm with a peak-to-background extinction ratio of 50 dB has been achieved with a DBR fiber laser.

Alternatively, the DBR fiber laser 10 in the FIG. 1A arrangement may be substituted with a doped fiber section in which dielectric layers are used to define the lasing cavity, instead of the fiber Bragg gratings. In this fiber laser, a doped fiber section has perpendicular end surfaces coated with dielectric materials having thicknesses selected to reflect light in a narrow linewidth centered about the output wavelength $\lambda_c$. Dielectric materials, such as $SiO_2$ and $TiO_2$, or $SiO_2$ and $ZrO_2$, may be used in thicknesses ranging from 3000 to 8000 nm in different designs. Of course, multiple dielectric coatings may be deposited on the end surfaces. Besides dielectric layers, metal layers of Au and Ti, may also be used as reflectors to define the lasing cavity.

However, the output power provided by the DBR fiber laser 10 or the DFB laser fiber 60 and the EDFA 12 of FIGS. 1A and 1B are fairly low for some applications. Adding more energy to the erbium-doped fiber sections 16 and 13 does not necessarily provide an increase in the output laser light. The erbium-doped fiber sections 16 and 13 in both devices 10 and 12 respectively, quickly become saturated. Further increases of pumping energy provide no further increases of output energy.

Figure 3:
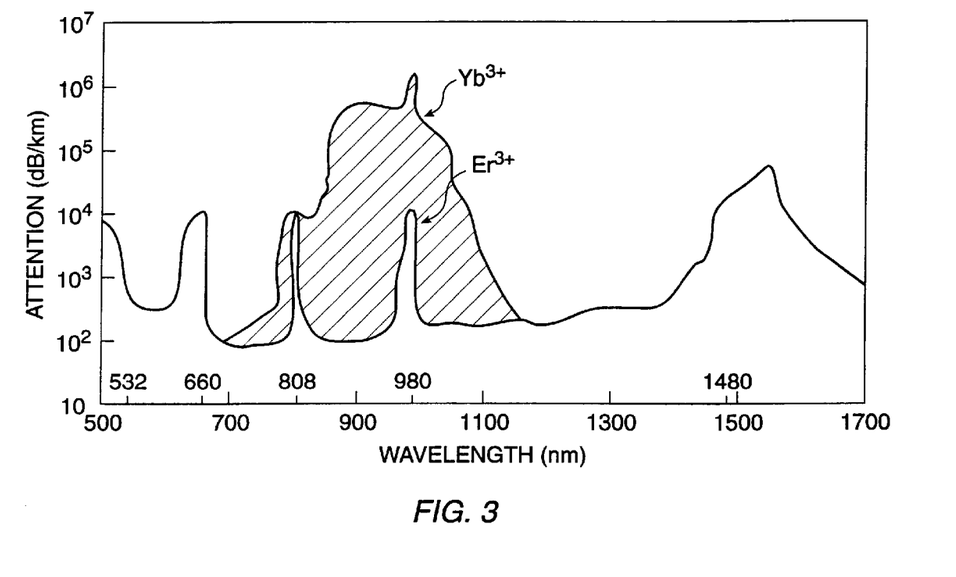
FIG. 3 is a graph illustrating attenuation of an optical signal in an optical fiber versus the wavelength of the signal for various dopants in the optical fiber.

On the other hand, the present invention recognizes that if the doped fiber sections 16 in the laser 10 and section 13 in the EDFA 12 are co-doped with ytterbium in addition to erbium, the gain provided by these sections is significantly enhanced with an increase of power from the pumping laser 18. FIG. 3 plots the attenuation of light at different wavelengths in an optical fiber. The absorption of light over a broad wavelength range is significantly enhanced with an optical fiber doped with erbium and ytterbium. In other words, the saturation level of an optical fiber is increased if the fiber is doped with both rare earth elements. As shown by the shaded section in the graph, ytterbium increases the practical absorption range of an erbium-doped fiber, which is narrowly centered about 980 nm, to a broad wavelength range 800 nm to over 1100 nm. Furthermore, the height of the shaded portion indicates the large increase in absorption coefficient with the added doping of ytterbium to the erbium. The high absorption coefficient in conjunction with a very high transfer efficiency from the ytterbium ions to the erbium ions significantly increases the optical gain and the output power of the fiber laser and amplifier.

Figure 4:
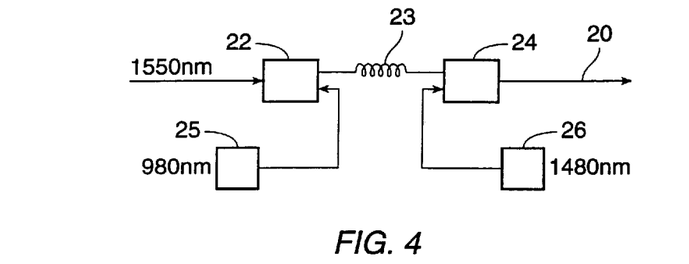
FIG. 4 is a block diagram of a rare-earth doped optical fiber amplifier with two pumping lasers according to one embodiment of the present invention.

FIG. 4 illustrates an arrangement for an optical fiber amplifier which takes advantage of a fiber section 23 doped with erbium and ytterbium. The fiber amplifier has a WDM coupler/isolator 22 (a "forward pump" type) described previously. The WDM coupler/isolator 22 is connected to an input optical fiber 21 carrying a message signal in the 1550 nm range, for example. The WDM coupler 22 is also connected to another input fiber from a pumping laser 25, which generates light at a first pumping wavelength, 980 nm, for example. The output port of the coupler 22 is connected to one end of the doped fiber section 23 so that the WDM coupler/isolator 22 passes light at both pumping and message wavelengths to the section 23.

The other end of the fiber section 23 is connected to an input fiber of second WDM coupler/isolator 24, which has its output port connected to an output fiber 20. A second input fiber from a second pumping laser 26 which generates light at a second pumping wavelength, 1480 nm, for example, is connected to the WDM coupler/isolator 24. The WDM coupler/isolator 24 passes the amplified message signals in the 1550 nm range from the section 23 to the output fiber 20. The light from the second pumping laser 26 is passed by the WDM coupler/isolator 24 back to the co-doped section 23. With a higher saturation level, the co-doped section 23 advantageously receives the energies from both pumping lasers 25 and 26 so that the message signal received from the input fiber 21 is amplified with a large gain and then passed on to the output fiber 20. It should be observed that one or both of the fiber sections 16 and 13 in the arrangement of FIG. 1A and the fiber sections 62 and 13 in the arrangement of FIG. 1B might be advantageously co-doped with erbium and ytterbium.

Figure 5:
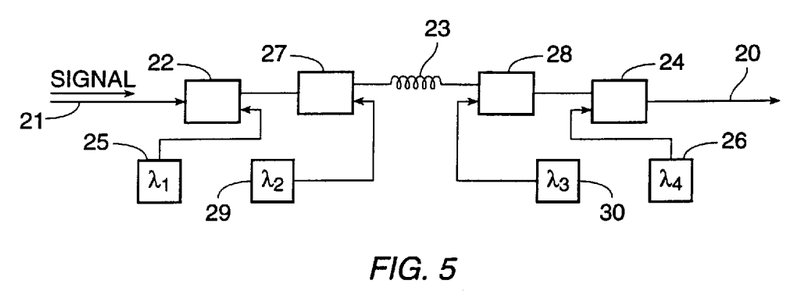
FIG. 5 is a block diagram of a rare-earth doped optical fiber amplifier with four pumping lasers according to another embodiment of the present invention.

FIG. 5 illustrates an optical fiber amplifier in which four pumping lasers energize the co-doped fiber section 23. The fiber amplifier has the previously described WDM coupler/isolator 22 which receives the message signal on the input fiber 21 and is connected to the first pumping laser 25, here shown generating light at $\lambda 1$. The output fiber of the coupler/isolator 22, which carries both the message light and pumping light at $\lambda 1$, is connected to one input fiber of a WDM coupler 27, which also has a second input fiber connected to a pumping laser 29 at wavelength $\lambda 2$. The output port of the WDM coupler 27 is connected to one end of the co-doped fiber section 23. The WDM coupler 27 passes the message signal in the 1550 nm range and the pumping light at $\lambda 1$ from its first input fiber to its output port and to the co-doped fiber section 23. The WDM coupler 27 also passes the pumping light at $\lambda 2$ from the pumping laser 29 to the output port and to the co-doped fiber section 23. A WDM coupler/isolator may be used in place of the WDM coupler 27, but the isolator should be effective at both the message wavelength and the pumping wavelength $\lambda 1$.

The other end of the co-doped fiber section 23 is connected to an input fiber of a WDM coupler 28, which has a second input fiber connected to a pumping laser 30 which generates light at a wavelength $\lambda 3$. The WDM coupler 28 is selected to pass the amplified message signals at 1550 nm from the co-doped fiber section 23 to the output port of the coupler 28 and to an input fiber of a WDM coupler/isolator 24. The light from the pumping laser 30 is sent back to the co-doped fiber section 23. As in the case of the WDM coupler 27, a WDM coupler/isolator may be used in place of the WDM coupler 28, but the isolator should be effective at both the message wavelength and the pumping wavelength $\lambda 4$.

As described previously, the WDM coupler/isolator 24 is connected to the output fiber 20 and the pumping laser 26 generating light at wavelength $\lambda 4$. The coupler/isolator 24 sends the pumping light at $\lambda 4$ to the WDM coupler 28 which is selected to transmit λ4 light to the lasing section 23. The coupler/isolator 24 also transmits the 1550 nm range signal from the WDM coupler 28 to the output fiber 20. With the described arrangement, the fiber section 23, co-doped with erbium and ytterbium, receives the pumping energy of all four lasers 25, 26, 29 and 30 at wavelengths λ1, λ2, λ3 and λ4.

Figure 6:
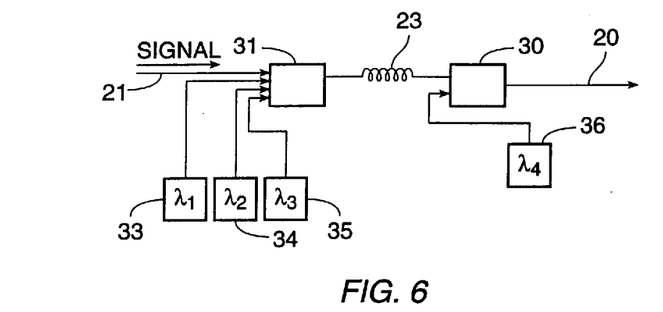
FIG. 6 is a block diagram of another rare-earth doped optical fiber amplifier with four pumping lasers according to an embodiment of the present invention.

FIG. 6 shows an alternative arrangement of an optical fiber amplifier with four pumping lasers 33–36 arranged differently than that of FIG. 5. In the FIG. 6 arrangement, only one WDM coupler/isolator 30 and a coupler 31 are used. The coupler 31 replaces three WDM coupler and coupler/isolators of FIG. 5. One input port of the coupler 31 is connected to the input fiber 21 carrying the 1550 nm range message signals. The other three input ports of the coupler 31 are connected to three pumping lasers 33–35, each respectively generating output light at wavelengths λ1, λ2, and λ3 respectively.

The coupler 31 may be constructed in various ways. One straightforward construction is a 4×1 fused biconical coupler. Another construction is a 4×1 coupler simplified from the disclosure found in U.S. Pat. No. 5,016,963, which issued May 21, 1991 to J. J. Pan and assigned to the present assignee. Still another construction is disclosed in U.S. application Ser. No. 08/470,815 cited above, in particular, with respect to FIGS. 7A and 7B.

The combined message signal from the fiber 21 and the optical energy of the pumping lasers 33–35 are sent by the coupler 31 to the doped fiber section 23. The WDM coupler/isolator 30 has one input fiber connected to the section and another input fiber connected to the fourth pumping laser 36 having an output wavelength λ4. As described previously, the coupler/isolator 30 passes the message signals in 1550 nm range amplified in the doped section 23 to the output fiber 20. The output light at wavelength λ4 generated by the fourth pumping laser 36 is sent to the doped fiber section 23 by the WDM coupler/isolator 30. Thus the section 23 receives the full energy of all four pumping lasers 33–36.

Figure 7A:
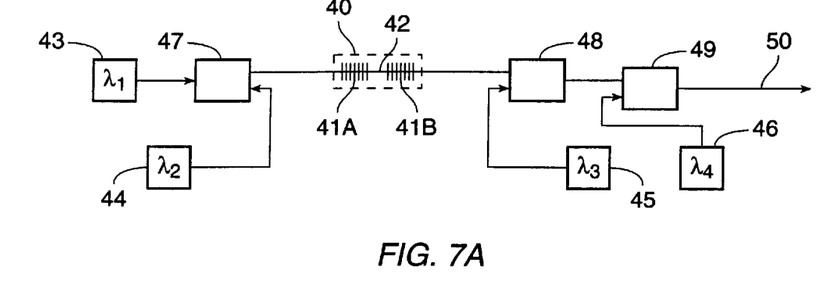
FIG. 7A is a block diagram of a DBR fiber laser with four pumping lasers according to an embodiment of the present invention.

The present invention also has implications for laser sources also. FIG. 7A illustrates a DBR laser 40 having a optical fiber section 42 co-doped with erbium and ytterbium between two fiber Bragg gratings 41A and 41B. With the increase in saturation level, the laser 40 is connected to four pumping lasers 43–46, each generating different output wavelengths λ1–λ4 respectively. The laser arrangement has the first pumping laser 43 connected to a coupler 47, which is also connected to the second pumping laser 44. The coupler 47 is a simplified 2×1 version of the coupler 30 of FIG. 6. The output of the WDM coupler 47 is connected to one terminal of the DBR laser 40.

An input fiber of a WDM coupler 48, as previously described, is connected to the other terminal of the DBR laser 40. (As stated previously, the WDM coupler 48 might be replaced with a WDM coupler/isolator if the isolator is effective at the proper wavelength ranges.) The second input fiber of the WDM coupler 48 is connected to the third pumping laser 45 and the output port of the coupler 48 is connected to an input fiber of a WDM coupler/isolator 49. The WDM coupler/isolator 49 has its second input fiber connected to the fourth pumping laser 46 and its output port connected to the output fiber 50.

The WDM coupler 48 passes the output signals of the DBR laser 40 to the WDM coupler/isolator 49. The WDM coupler/isolator 49, in turn, passes these signals, in the 1550 nm range, to the output fiber 50. On the other hand, the energy from the pumping laser 45 at a shorter wavelength λ3 is sent back to the DBR laser 40 by the WDM coupler 48. Similarly, the WDM coupler/isolator 49 sends the energy from the pumping laser 46 at shorter wavelength λ4 back to the DBR laser 40 through the WDM coupler 48. Thus the energies of the four pumping lasers 43–46 are directed to the DBR laser 40, the output of which passes through the WDM coupler and coupler/isolators 48 and 49 to the output fiber 50.

Figure 7B:
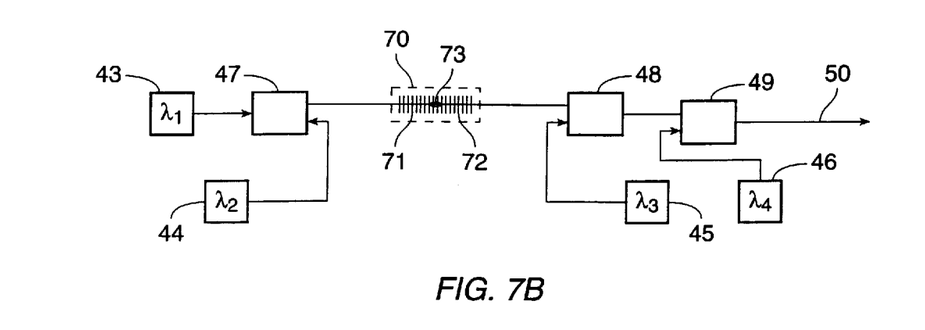
FIG. 7B is the same arrangement with a DFB fiber laser, instead of the FIG. 7A DBR fiber laser.

FIG. 7B illustrates the same arrangement as in FIG. 7A, except that the fiber DBR laser 40 is replaced by a fiber DFB laser 70. The DFB fiber laser 70 is formed from a fiber section 72 which is co-doped with the ions of erbium and ytterbium. A single fiber Bragg grating 71 is formed in the co-doped fiber section 72 with a phase shift region 73 central to the fiber Bragg grating 71.

Figure 8A:
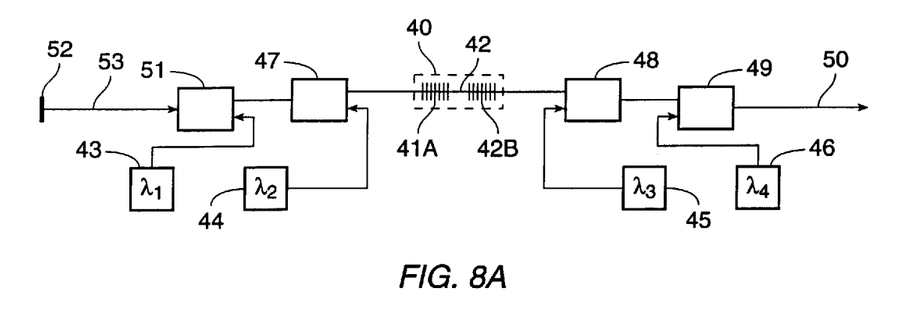
FIG. 8A is a block diagram of another DBR fiber laser with four pumping lasers according to another embodiment of the present invention.

FIG. 8A illustrates another arrangement for a DBR laser 40 which is pumped by four lasers 43–46. This arrangement operates like that of the fiber amplifier of FIG. 5. However, there is a termination 52 on an "input" fiber 53 to the WDM coupler 51, for which a WDM coupler/isolator might be used instead. The paths of the described WDM coupler 51 are bidirectional. Hence, while the WDM coupler/isolator 22 of FIG. 5 receives a message signal on the input fiber 21, the corresponding WDM coupler 51 of FIG. 8A can also pass signals generated by the DBR laser 40 to the "input" fiber 53. If signals are indiscriminately reflected back through the DBR laser 40, operation of the laser 40 may be hindered. The termination 52 ensures that only light at the proper wavelength is reflected back into the laser 40; light at other wavelengths are eliminated.

Figure 8B:
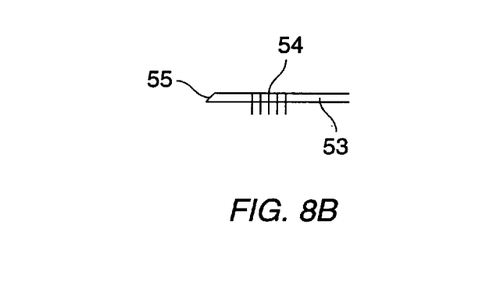
FIG. 8B is a detail of the termination of one of the optical fibers of the FIG. 8A DBR fiber laser device.

FIG. 8B details the termination 52 of the input fiber 53 to the WDM coupler 51. The optical fiber 53 ends in a surface which is angled to the perpendicular of the longitudinal axis of the fiber 53. The end surface 55 of the fiber 53 is slant-polished (as shown in an exaggerated fashion) and covered with an anti-reflection coating. This allows any light which reaches the end surface 55 to leave the fiber 53. The termination 52 also has a fiber Bragg grating 54 which reflects light in a narrow band about the output wavelength $\lambda_c$ of the DBR laser 40, which enhances the lasing action of the laser 40. Note that the DBR fiber laser 40 in FIG. 8A can be replaced by a DFB fiber laser, as in the DFB fiber laser 70 does in the arrangement of FIG. 7B.

Both optical fiber amplifier and laser source arrangements in FIGS. 4–8A may also benefit from a short section of doped praseodymium to cut down relaxation oscillations if the message signals on the input fiber 21 are at high bit rates, as described previously.

Other combinations of pumping lasers, WDM couplers/isolators, and erbium/ytterbium doped fiber sections to create fiber amplifier devices and fiber laser sources are possible. In the case of fiber laser sources, while reflecting dielectric or metal layers may be substituted for the fiber Bragg gratings to define the lasing cavity, it is believed that the fiber Bragg gratings are superior. Besides better definition of output wavelength and linewidth, the fiber Bragg gratings are less susceptible to burnout from the higher power emanating from Er/Yb-doped fiber sections.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A laser source for generating light at least one selected wavelength in an output optical fiber, said source comprising a fiber laser having at least one mirror element and a first optical fiber section coupled to said one mirror element for lasing action at least said one selected wavelength, said optical fiber section having at least a portion doped with erbium, a first end for receiving pumping laser light, and a second end; and an optical fiber amplifier having a second optical fiber section, said second optical fiber section having at least a portion doped with erbium and a first end connected to said second end of said fiber laser by a first WDM coupler and a second end connected to said output optical fiber by a second WDM coupler such that said first WDM coupler sends said pumping laser light to said second WDM coupler and said second WDM coupler directs said pumping laser light into said second optical fiber section.

2. The laser source of claim 1 wherein said fiber laser comprises a second mirror element, said first optical fiber section between said one mirror element and said second mirror element to form a DBR fiber laser.

3. The laser source of claim 2 wherein said mirror elements each comprise a fiber Bragg grating.

4. The laser source of claim 2 wherein said mirror elements each comprise a dielectric coating.

5. The laser source of claim 4 wherein said mirror elements each further comprise a fiber Bragg grating.

6. The laser source of claim 2 wherein said mirror elements each comprise a metal coating.

7. The laser source of claim 6 wherein said mirror elements each further comprise a fiber Bragg grating.

8. The laser source of claim 1 wherein said one mirror element is associated with said first optical fiber section to form a DFB fiber laser.

9. The laser source of claim 8 wherein said one mirror element comprises a fiber Bragg grating.

10. The laser source of claim 1 wherein said one selected wavelength is in the 1550 nm range and said pumping laser light has a wavelength below 1500 nm.

11. The laser source of claim 10 wherein said pumping laser light has a wavelength selected from the group comprising 800, 850, 900–970, 980, 1047, 1068 and 1480 nm.

12. The laser source of claim 1 wherein said first optical section is doped with praseodymium.

13. The laser source of claim 1 wherein said first optical section is co-doped with ytterbium.

14. An optical fiber amplifier receiving message signals in an input output fiber and amplifying said message signal for an output optical fiber, said message signals at a first wavelength, said optical fiber amplifier comprising a section of optical fiber at least a portion of which is co-doped with erbium and ytterbium, said section having a first end connected to said input optical fiber and a second end connected to said output optical fiber; and a plurality of pumping lasers at shorter wavelengths than said first wavelength, said pumping lasers connected to said optical fiber section so as to provide energy to said optical fiber section for providing gain to said message signals in passing from said first end to said second end.

15. The optical fiber amplifier of claim 14 further comprising a first pumping laser generating output light at a second wavelength;

a second pumping laser generating output light at a third wavelength;

a first WDM coupler connected to said input optical fiber, said first pumping laser and said first end of said optical fiber section, said first WDM coupler passing message signals at said first wavelength to said first end and output light at said second wavelength from said first pumping laser to said first end; and a second WDM coupler connected to said output optical fiber, said second pumping laser and said second end of said optical fiber section, said second WDM coupler passing amplified message signals at said first wavelength from said second end to said output optical fiber and output light at said third wavelength from said second pumping laser to said second end;

whereby said first and second pumping lasers provide energy to said co-doped optical fiber section.

16. The optical fiber amplifier of claim 15 further comprising a third pumping laser generating output light at a fourth wavelength;

a fourth pumping laser generating output light at a fifth wavelength;

a third WDM coupler connected between said first WDM coupler and said input optical fiber, said third WDM coupler also connected to said third pumping laser, said third WDM coupler passing message signals at said first wavelength from said input optical fiber and output light at said fourth wavelength from said third pumping laser to said first WDM coupler, said first WDM coupler passing said message signals at said first wavelength and output light at said fourth wavelength to said first end;

a fourth WDM coupler connected between said second WDM coupler and said output optical fiber, said fourth WDM coupler also connected to said fourth pumping laser, said fourth WDM coupler passing amplified message signals at said first wavelength from said second WDM coupler to said output optical fiber and output light at said fifth wavelength from said fourth pumping laser to said second WDM coupler, said second WDM coupler passing said output light at said fifth wavelength to said second end; and whereby said third and fourth pumping lasers provide energy to said co-doped optical fiber section.

17. The optical fiber amplifier of claim 14 further comprising a first pumping laser generating output light at a second wavelength;

a second pumping laser generating output light at a third wavelength;

a third pumping laser generating output light at a fourth wavelength;

a fourth pumping laser generating output light at a fifth wavelength;

a first coupler connected to said input optical fiber, said first, second and third pumping lasers and said first end of said optical fiber section, said first coupler passing message signals at said first wavelength to said first end and output light at said second, third and fourth wavelengths from said first, second and third pumping lasers to said first end; and a WDM coupler connected to said output optical fiber, said fourth pumping laser and said second end of said optical fiber section, said WDM coupler passing amplified message signals at said first wavelength from said second end to said output optical fiber and output light at said fifth wavelength from said fourth pumping laser to said second end;

whereby said first, second, third and fourth pumping lasers provide energy to said co-doped optical fiber section.

18. The optical fiber amplifier of claim 14 wherein said doped optical fiber section has a portion doped with praseodymium.

19. The optical fiber amplifier of claim 14 wherein said first wavelength is in the 1550 nm range and said second and third wavelengths are below 1500 nm.

20. The optical amplifier of claim 19 wherein either second or third wavelength is selected from the group comprising 800, 850, 900–970, 980, 1047, 1068 and 1480 nm.

21. A laser source generating message signals for an output optical fiber, said message signals at a first wavelength, said laser source comprising
 a section of optical fiber, at least a portion of which is co-doped with erbium and ytterbium, said section having a first end connected to said input optical fiber and a second end connected to said output optical fiber;
 at least one mirror element coupled to said optical fiber section for lasing action at said first wavelength; and
 a plurality of pumping lasers at wavelengths shorter than said first wavelength, said pumping lasers connected to said optical fiber section so as to provide energy to said optical fiber section for lasing action in said cavity at said first wavelength.

22. The laser source of claim 21, wherein said laser source comprises a second mirror element, said optical fiber section between said one mirror element and said second mirror element to form a DBR fiber laser.

23. The laser source of claim 22 wherein said mirror elements each comprise a fiber Bragg grating.

24. The laser source of claim 22 wherein said mirror elements each comprise a dielectric coating.

25. The laser source of claim 24 wherein said mirror elements each further comprise a fiber Bragg grating.

26. The laser source of claim 22 wherein said mirror elements each comprise a metal coating.

27. The laser source of claim 26 wherein said mirror elements each further comprise a fiber Bragg grating.

28. The laser source of claim 21 wherein said one mirror element is associated with said first optical fiber section to form a DFB fiber laser.

29. The laser source of claim 28 wherein said one mirror element comprises a fiber Bragg grating.

30. The laser source of claim 21 further comprising
 a first pumping laser generating output light at a second wavelength;
 a second pumping laser generating output light at a third wavelength;
 a first WDM coupler connected to said first pumping laser and said first end of said optical fiber section, said first WDM coupler passing output light at said second wavelength from said first pumping laser to said first end;
 a second WDM coupler connected to said output optical fiber, said second pumping laser and said second end of said optical fiber section, said second WDM coupler passing message signals at said first wavelength from said second end to said output optical fiber and output light at said third wavelength from said second pumping laser to said second end; and
 whereby said first and second pumping lasers provide energy to said co-doped optical fiber section.

31. The optical fiber amplifier of claim 30 further comprising
 a third pumping laser generating output light at a fourth wavelength, said third pumping laser connected to said first WDM coupler, said first WDM coupler passing output light at said fourth wavelength from said third pumping laser to said first end;
 a fourth pumping laser generating output light at a fifth wavelength;
 a third WDM coupler connected between said second WDM coupler and said output optical fiber, said third WDM coupler also connected to said fourth pumping laser, said third WDM coupler passing message signals at said first wavelength from said second WDM coupler fiber to said output optical fiber, and output light at said fifth wavelength from said fourth pumping laser to said second WDM coupler, said second WDM coupler passing said output light at said fifth wavelength to said first end; and
 whereby said third and fourth pumping lasers provide energy to said co-doped optical fiber section.

32. The optical fiber amplifier of claim 30 further comprising
 a third pumping laser generating output light at a fourth wavelength,;
 a fourth pumping laser generating output light at a fifth wavelength;
 a third WDM coupler connected between said second WDM coupler and said output optical fiber, said third WDM coupler also connected to said fourth pumping laser, said third WDM coupler passing message signals at said first wavelength from said second WDM coupler fiber to said output optical fiber, and output light at said fifth wavelength from said fourth pumping laser to said second WDM coupler, said second WDM coupler passing said output light at said fifth wavelength to said first end;
 a fourth WDM coupler connected to said first WDM coupler and said third pumping laser, said fourth WDM coupler passing output light at said fourth wavelength from said third pumping laser to said first WDM coupler, said first WDM coupler passing output light at said fourth wavelength to said first end; and
 whereby said third and fourth pumping lasers provide energy to said co-doped optical fiber section.

* * * * *